United States Patent
Gilboy et al.

(10) Patent No.: US 8,789,665 B2
(45) Date of Patent: Jul. 29, 2014

(54) CARBON FIBER REINFORCED CARBON MATRIX COMPOSITE FOR BRAKE PAD BACK PLATE

(75) Inventors: Lawrence Frank Gilboy, University Heights, OH (US); Richard A. Wolf, Ravenna, OH (US); Aaron M. Morey, Pataskala, OH (US)

(73) Assignee: Carlisle Brake & Friction, Inc., Solon, OH (US)

( * ) Notice: Subject to any disclaimer, the term of this patent is extended or adjusted under 35 U.S.C. 154(b) by 435 days.

(21) Appl. No.: 12/560,714

(22) Filed: Sep. 16, 2009

(65) Prior Publication Data

US 2010/0065389 A1 Mar. 18, 2010

Related U.S. Application Data

(60) Provisional application No. 61/098,132, filed on Sep. 18, 2008.

(51) Int. Cl.
*F16D 69/00* (2006.01)

(52) U.S. Cl.
USPC .................................. 188/251 A; 188/250 B

(58) Field of Classification Search
USPC ....... 188/251 R, 251 A, 251 B, 250 R, 250 B
See application file for complete search history.

(56) References Cited

U.S. PATENT DOCUMENTS

| | | | |
|---|---|---|---|
| 3,728,423 A | 4/1973 | Shaffer | |
| 3,857,469 A * | 12/1974 | Stimson | 192/107 M |
| 3,972,395 A * | 8/1976 | Jannasch et al. | 188/251 A |
| 4,041,116 A | 8/1977 | Baud et al. | |
| 4,297,307 A | 10/1981 | Taylor | |
| 4,438,004 A * | 3/1984 | Myers | 428/550 |
| 4,457,967 A | 7/1984 | Chareire et al. | |
| 4,554,024 A | 11/1985 | Zimmer et al. | |
| 5,009,823 A | 4/1991 | Kromrey | |
| 5,236,528 A * | 8/1993 | Nakagawa | 156/153 |

(Continued)

FOREIGN PATENT DOCUMENTS

| | | |
|---|---|---|
| EP | 0251301 | 1/1988 |
| JP | 01-320328 | * 12/1989 |

(Continued)

OTHER PUBLICATIONS

International Search Report dated May 10, 2010 for PCT/US2009/057082.

(Continued)

*Primary Examiner* — Bradley King
*Assistant Examiner* — Vishal Sahni
(74) *Attorney, Agent, or Firm* — Pearne & Gordon LLP

(57) ABSTRACT

A brake pad assembly is provided, including a friction lining providing a wear surface for contacting a brake rotor and a back plate coupled to the friction lining. The back plate is made of a carbon fiber reinforced carbon matrix composite. In one example, a majority of the carbon fibers of the back plate are oriented in a x-y in-plane direction resulting in a structure where the thermal conductivity is at least 2 times greater in the x-y in-plane direction versus a z through-plane direction. In another example, the back plate is provided as at least one sheet of a carbon fiber reinforced carbon matrix composite. A method of manufacturing the brake pad assembly is also provided.

26 Claims, 8 Drawing Sheets

(56) References Cited

U.S. PATENT DOCUMENTS

| | | | |
|---|---|---|---|
| 5,377,792 A * | 1/1995 | Idesawa | 188/264 G |
| 5,382,392 A | 1/1995 | Prevorsek et al. | |
| 5,439,080 A | 8/1995 | Haneda et al. | |
| 5,535,860 A * | 7/1996 | Hummel et al. | 188/250 B |
| 5,654,059 A | 8/1997 | Hecht | |
| 5,744,075 A | 4/1998 | Klett et al. | |
| 5,803,210 A | 9/1998 | Kohno et al. | |
| 5,984,055 A | 11/1999 | Strasser et al. | |
| 6,042,935 A * | 3/2000 | Krenkel et al. | 428/307.7 |
| 6,062,351 A | 5/2000 | Strasser et al. | |
| 6,273,222 B1 | 8/2001 | Rebstock et al. | |
| 6,277,769 B1 | 8/2001 | Dowell et al. | |
| 6,474,453 B2 * | 11/2002 | Sano | 188/251 A |
| 6,521,152 B1 | 2/2003 | Wood et al. | |
| 6,691,393 B2 * | 2/2004 | James et al. | 29/419.1 |
| 7,090,057 B2 | 8/2006 | Fryska et al. | |
| 2001/0030094 A1 * | 10/2001 | Pareti | 188/250 R |
| 2002/0179382 A1 * | 12/2002 | Fryska et al. | 188/218 XL |
| 2003/0155193 A1 | 8/2003 | Hays, Jr. et al. | |
| 2006/0108182 A1 * | 5/2006 | Walker et al. | 188/1.11 W |

FOREIGN PATENT DOCUMENTS

| | | | |
|---|---|---|---|
| JP | 04157219 A | | 5/1992 |
| JP | 07042774 A | | 2/1995 |
| JP | 10267061 | * | 10/1998 |
| WO | 9201648 | | 2/1992 |

OTHER PUBLICATIONS

Delmonte, J., Chapter 13: High Temperature Resistant Matrices for Service Above 300° C. (Metal Matrices and Carbon/Carbon Composites) in "Technology of Carbon and Graphite Fiber Composites," 1987, pp. 388-421, Robert E. Krieger Publishing Company, Malabar, Florida.

Goertzen, W.K. and Kessler, M.R., "Dynamic mechanical analysis of carbon/epoxy composites for structural pipeline repair," Composites Part B: Engineering, 2007, pp. 1-9, vol. 38.

Savage, G., Carbon-Carbon Composites, 1993, pp. 308-319, Chapman & Hall, London, England.

Manocha, L.M., "High performance carbon-carbon composites," Sadhana, Feb./Apr. 2003, pp. 349-358, vol. 28, Parts 1 & 2.

Walther, B.M., "An Investigation of the Tensile Strength and Stiffness of Unidirectional Polymer-Matrix, Carbon-Fiber Composites under the Influence of Elevated Temperatures," Master's Thesis, Virginia Polytechnic Institute and State University, May 27, 1998, 125 pages, Blacksburg, Virginia.

* cited by examiner

CARBON FIBER REINFORCED CARBON MATRIX COMPOSITE FOR BRAKE PAD BACK PLATE

CROSS-REFERENCE TO RELATED APPLICATIONS

This application claims the benefit of U.S. Provisional Application No. 61/098,132, filed Sep. 18, 2008, the entire disclosure of which is hereby incorporated herein by reference.

FIELD OF THE INVENTION

The present invention generally relates to brake pads and, in particular, to improvements in brake pad assemblies.

BACKGROUND OF THE INVENTION

Many vehicles today, such as automobiles, motorcycles, trucks, trains, and aircraft, employ a caliper-disc brake assembly as the primary mechanism for deceleration. The caliper-disc brake system (FIG. 1, prior art) generally includes a pair of brake pads 30 arranged on opposite sides of the annular surfaces of a rotating disc, or rotor 20 coupled to a wheel or other rotating structure. The rotor is disposed between a brake actuating mechanism, of which the brake actuating mechanism is provided outside of the pair of brake pads 30. The brake actuating mechanism generally includes a caliper 26 with at least one pair of opposing pistons 24 which respectively abut the back plates 34 of a pair of brake pads, thus, the brake pads are positioned such that the friction linings 32 face the surfaces of the rotor 20. Alternatively, it is known in the art that a floating caliper design may also be used which may have one or more pistons on one side of the caliper, but no pistons on the opposite side, and it is also known in the art that the caliper may contain more than one brake pad on each side of the disc.

As the wheel (not shown) rotates, the rotor attached to the wheel via a spindle rotates with it along a rotational axis. Alternatively, it is also known in the art that the rotor may be mounted to the drive shaft. When the brake system is actuated, the pistons are brought closer to each other by e.g., a hydraulic pressure mechanism using brake caliper fluid, and the piston and caliper force the brake pads toward the rotor such that the friction linings are forced against the annular surfaces of the rotor from opposing sides. It is also known in the art that brake actuation may be achieved pneumatically, electrically, and/or mechanically. Since the caliper can be attached to the suspension of the automobile (or other vehicle, structure, etc.), it prevents the pistons and brake pads from rotating with the rotor, thus producing a braking force between the brake pad and the rotor.

FIG. 3 illustrates example forces associated with brake actuation. Typically, the piston has an annular face that contacts the brake pad back plate 34 when the brake is actuated, which introduces a compressive normal force ($F_{piston}$) that forces the piston to push the brake pad against the rotor. A bending force ($F_{flex}$) may also be produced if the piston contacts only a relatively small area in the center of the back plate. When brake actuation occurs during rotation of the brake rotor, the friction linings of the brake pads are forced against the rotor surfaces and produce a frictional stopping force ($F_{friction}$). Since the brake pads are contained in the caliper and are prevented from rotating with the disc, a shear force ($F_{shear}$) that counteracts the friction force ($F_{friction}$) is created within the brake pad. Therefore, the brake pad back plate should be able to withstand the compressive and bending forces encountered during brake actuation, and the brake pad assembly should be able to withstand the shear forces encountered during braking.

Under dynamic braking conditions, friction converts the kinetic energy of the vehicle into thermal energy. Therefore, as the mass and velocity of the vehicle increases, the amount of kinetic energy increases and the corresponding thermal energy produced under braking also increases. The thermal energy produced during frictional braking is transferred as heat into the disc brake components (FIG. 1). Depending on the rate of heat introduced into the braking system compared to the rate of heat expelled from the system, the temperatures of disc brake components may be elevated to a level surpassing their designed operational limits, thus leading to failure. In some high-energy (e.g., racing) applications the temperature of the rotor may be in excess of 700° C. (1,292° F.), the brake pads in excess of 500° C. (932° F.), and the caliper fluid in excess of 200° C. (392° F.). Typical modes of failure may include rotor fracture, loss of frictional force from the friction lining (brake fade), shearing through the friction lining and separation from the back plate, and/or caliper brake fluid boiling (brake fluid fade).

In one example, brake fluid fade occurs when the temperature of the brake fluid (e.g., caliper fluid) reaches its boiling point. In a typical disc brake, the caliper uses hydraulic pressure to generate a force to the pistons that contact the brake pads. The brake fluid in a hydraulic caliper is able to transmit force across a distance because it is able to be pressurized, which is easier to accomplish in its natural fluid state than after it has boiled into a gaseous form. Thus, if the brake fluid temperature reaches its boiling point and vaporizes during use, the result is a partial or complete loss in the ability to transmit force to the brake pad which can result in a loss of deceleration capability. Heat transfer to the caliper brake fluid is primarily achieved by conduction of heat through the brake pad to the pistons 24, and then to the caliper brake fluid. Therefore, the through-plane 42 (z-direction, see FIG. 2) thermal conductivities of the component parts of a brake pad can influence caliper brake fluid temperature.

The overall mass of the brake system may also have an impact on vehicle dynamics such as handling and ride quality. The brake system components (FIG. 1), along with the wheels, tires, and some suspension components are considered unsprung weight (i.e., undamped weight), whereas the remaining weight of the vehicle that is supported by the suspension is considered sprung weight (i.e., damped weight). The unsprung weight of a vehicle is one of the most critical factors affecting a vehicle's road holding ability. Since unsprung weight is not supported by the suspension, it is the weight that is most susceptible to forces induced by bumps and surface imperfections in the road. Therefore, reducing unsprung weight can reduce, such as minimize, the burden placed on controlling the motion of the wheels and tires, which may allow the use of smaller suspension springs and shocks, or may allow the original suspension springs and shocks to have a greater reserved capacity to control vehicle body motion. Since unsprung weight is largely a function of the mass of a vehicle's braking components, reducing the weight of brake components (e.g., brake pads) will generally improve handling and ride quality.

Conventional brake pads typically employ a friction lining that is mechanically fastened, adhesive bonded, or molded to a metal back plate. The friction lining is known in the art and may be comprised of a resin-bonded composite containing resin, fibers, and filler material; or the friction lining may be comprised of a sintered-metallic composite containing sintered metals and filler material; or the friction lining may be comprised of a carbon/carbon composite containing carbon fibers and/or filler material reinforced in a carbon matrix. The types and amount of the constituents in the friction lining are chosen so as to impart the desirable characteristic of the brake pad, including high or low coefficient of friction, high temperature stability, and wear resistance.

The brake pad back plate is typically made of steel, but in some applications may be made of other metals or metal alloys. Metal back plates are typically denser than the friction lining and may therefore contribute a majority of the mass of the brake pad. Also, metal back plates are isotropic materials, such that their thermal and mechanical properties are the same in all crystallographic directions. The isotropic behavior of such metal back plates means that thermal conductivity is the same in all directions (FIG. 4), and therefore heat will generally not be preferentially conducted away from the area of the back plate where the caliper pistons come into contact. Since the thermal conductivity of metal back plates (see Table 1) is typically higher than that of the friction lining, and because metal back plates exhibit isotropic behavior, there is a likelihood for heat to be conducted in the through-plane 42 (i.e., z-axis) direction to the caliper brake fluid via the pistons, which may cause a loss in deceleration ability due to brake fluid fade.

TABLE 1

| Manufacturer | Grade | Fiber Type | Thermal Conductivity (W/m-K) | | Ratio | Density |
| | | | In plane (X-Y) | Through-Plan (Z) | (X-Y:Z) | (g/cc) |
| --- | --- | --- | --- | --- | --- | --- |
| Various | 1010 Steel | n/a | 55.5(a) | 55.5(a) @ 200 C. | 1.0 | 7.86 |
| Various | 4140 Steel | n/a | 42.3(a) | 42.3(a) @ 200 C. | 1.0 | 7.83 |
| Various | Titanium | n/a | 17(a) | 17(a) @ 20 C. | 1.0 | 4.5 |
| Blackhawk | 31CL | Chopped | 3.2(b) | 1.4(b) | 2.3 | 1.6 |
| Blackhawk | 31HD | Chopped | 123(b) | 46(b) | 2.7 | 1.75 |
| Carbon Composites Inc. | CCP130-12 | Fabric lay-up | 30(c.) | 6(c.) | 5.0 | 1.35 |
| GoodFellow | C413050 | Fabric lay-up | 250(d) | 50(d) | 5.0 | 1.3 |

(a)ASM Metals Handbook Desk Edition, 1985 pg (1-48, 1-63)
(b)Online product data sheet available at www.wellmanproducts.com
(c)Online Product data sheet available at www.carboncompositesinc.com
(d)Online product data sheet available at www.goodfellow.com
Regarding the product data sheet available at www.wellmanproducts.com, 31CL is represented by As Carbonized; 31HD is represented by Heat Treated/Densified.

For the foregoing reasons, it can be beneficial to provide a brake pad assembly that will reduce the mass of the brake pad and in turn reduce the unsprung weight of the vehicle, which will improve ride quality and operational stability. Further, it can be beneficial to provide a brake pad assembly that can resist thermal degradation at the elevated temperatures encountered during vehicle operation and can improve the thermal management of the braking system, whereby improving thermal management means to preferentially conduct heat away from the caliper pistons by increasing the ratio of in-plane 40 (i.e., x & y-axes) thermal conductivity to through-plane 42 (i.e., z-axis) thermal conductivity. Diverting heat away from the caliper pistons will reduce the propensity for losing caliper brake pressure by brake fluid boiling. Additionally it can be beneficial to provide a brake pad assembly that can utilize the aforementioned necessary improvements while still maintaining the ability to use conventional resin-bonded, sintered-metallic, or carbon/carbon friction linings.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, a brake pad assembly is provided, comprising a friction lining providing a wear surface for contacting a brake rotor and a back plate coupled to the friction lining. The back plate is made of a carbon fiber reinforced carbon matrix composite. The carbon fibers of the back plate are substantially continuous along said length of the back plate In accordance with another aspect of the present invention, a brake pad assembly is provided, comprising a friction lining providing a wear surface for contacting a brake rotor and a back plate coupled to the friction lining. The back plate is made of a carbon fiber reinforced carbon matrix composite. A majority of the carbon fibers of the back plate are oriented in a x-y in-plane direction resulting in a structure where the thermal conductivity is at least 2 times greater in the x-y in-plane direction versus a z through-plane direction.

In accordance with another aspect of the present invention, a method of manufacturing a brake pad assembly is provided, comprising the steps of providing a friction lining providing a wear surface for contacting a brake rotor and providing a back plate coupled to the friction lining. The back plate is provided as at least one sheet of a carbon fiber reinforced carbon matrix composite. The method further comprises the step of coupling the friction lining to the carbon/carbon composite back plate by at least one secondary operation or in situ process.

It is to be understood that both the foregoing general description and the following detailed description present example and explanatory embodiments of the invention, and are intended to provide an overview or framework for understanding the nature and character of the invention as it is claimed. The accompanying drawings are included to provide a further understanding of the invention and are incorporated into and constitute a part of this specification. The drawings illustrate various example embodiments of the invention, and together with the description, serve to explain the principles and operations of the invention.

BRIEF DESCRIPTION OF THE DRAWINGS

The foregoing and other aspects of the present invention will become apparent to those skilled in the art to which the present invention relates upon reading the following description with reference to the accompanying drawings, in which.

DESCRIPTION OF EXAMPLE EMBODIMENTS

Figure 1:
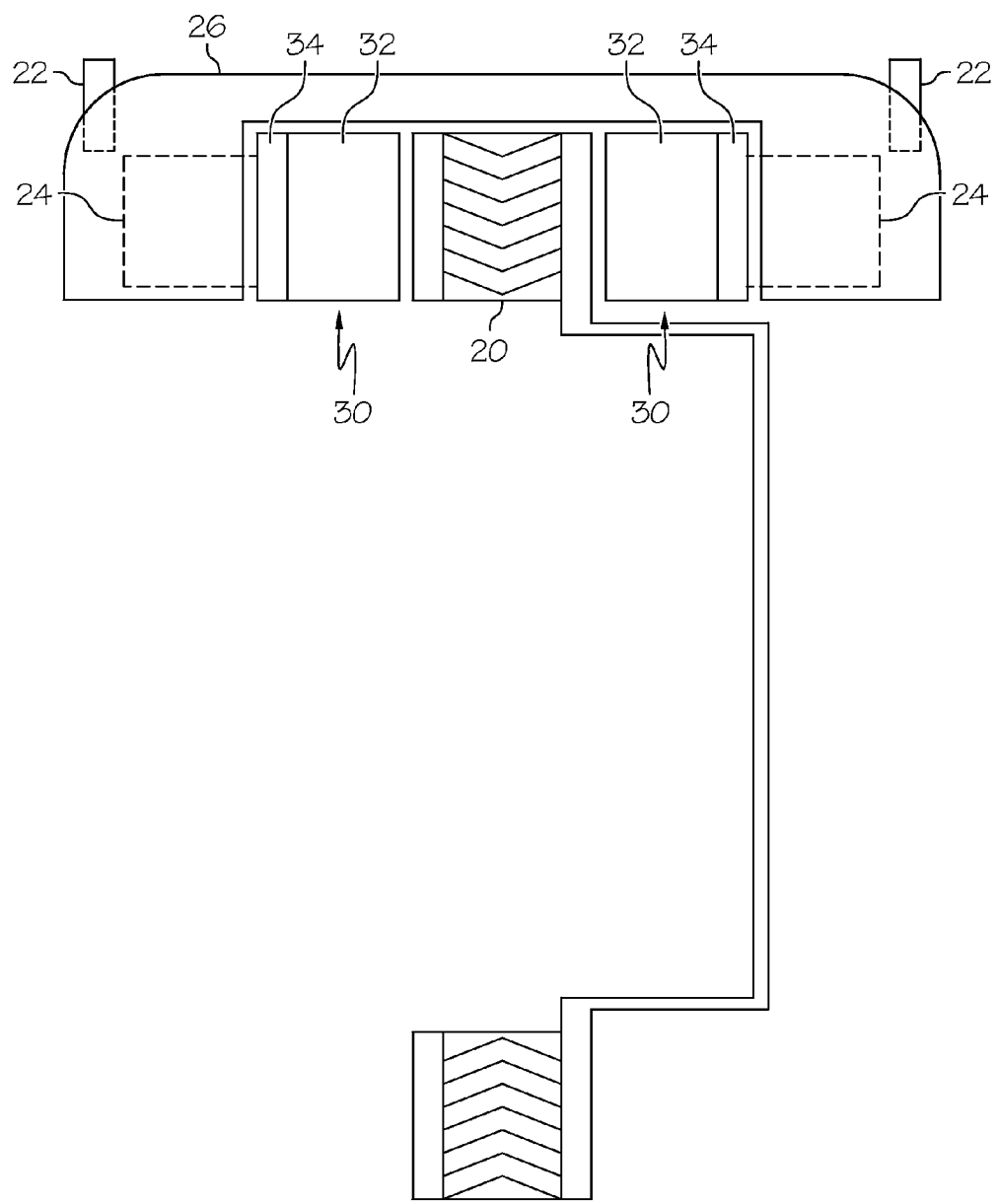
FIG. 1 is a simplified front view of a prior art caliper disc brake of the type used on automobiles.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

The present invention is generally directed to a brake pad having a friction lining and a back plate, where the friction lining is as known in the art and may be comprised of a resin-bonded composite, sintered-metallic composite, or carbon/carbon composite and the back plate is formed from a carbon fiber reinforced carbon matrix composite generally as known in the materials art (carbon/carbon composite, or C/C composite, or C/C). The brake pad may be assembled by combining the fully-formed friction lining to the fully-formed C/C back plate by secondary operations such as mechanical fastening or adhesive bonding. Alternatively, the brake pad may be formed by combining the fully-formed back plate to the friction lining material in situ during the forming (e.g., molding, sintering, or carbonizing) of the friction material (resin-bonded, sintered-metallic, or carbon/carbon, respectively). This in situ combination may be accomplished in various manners, such as by integral molding, mechanical retention, or liquid phase infiltration and adhesion. Combinations of secondary operations and in situ methods are also considered.

Wherefore, it is an object of the present invention to provide a brake pad with a carbon/carbon composite back plate that can reduce mass and unsprung weight by forming the back plate of a material with a lower apparent density than traditional metal back plates.

Wherefore, it is another object of the present invention to provide a brake pad with a carbon/carbon composite back plate that can resist thermal degradation at elevated temperatures in excess of 375° C. (707° F.) and can reduce heat transfer to the pistons by utilizing its anisotropic material behavior to preferentially conduct heat away from the caliper pistons as to reduce the propensity for brake fluid boiling.

Wherefore, it is yet another object of the present invention to provide a brake pad with a carbon/carbon composite back plate that can be combined to a semi-metallic, organic, ceramic, non-asbestos organic, low-metallic, sintered-metallic, or carbon/carbon composite friction lining via secondary operations (e.g., mechanical fastening or adhesive bonding), or in situ means (e.g., integral molding, mechanical retention, or liquid phase infiltration and adhesion), or a combination thereof.

Certain features, aspects, and advantages of the present invention will become better understood with reference to the detailed description of example preferred embodiments which follows hereinafter when taken in conjunction with the drawing figures which accompany it.

Figure 2:
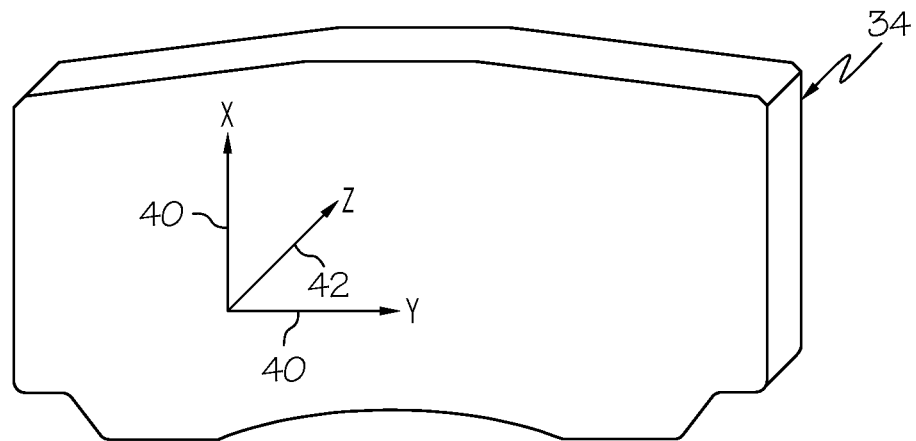
FIG. 2 is a three-dimensional view providing axis identification.

Turning now to the shown examples of FIGS. 1 and 2, the present invention generally relates to a brake pad 30 having a friction lining 32 and a back plate 34. The friction lining 32 and the back plate 34 each have a generally planar surface, and respectively, are arranged so as to confront one another to form a substantially planar interface between them. The friction lining 32 provides a wear surface for contacting the brake rotor 20 to produce the frictional stopping force ($F_{friction}$).

The friction lining material 32 used in the present invention is as known in the art and may be a commercially available friction material such as, but not limited to, a resin-bonded composite, sintered-metallic composite, or carbon/carbon composite.

Resin-bonded friction composites typically include, but are not limited to, so-called semi-metallics, low-metallics, non-asbestos organics, ceramics, and organics. The type of resin-bonded friction lining is usually designated by the typical constituents comprising the resin-bonded composite which may include, but is not limited to, at least one of fibers (e.g., metallic fibers, carbon fibers, organic fibers, glass fibers, and ceramic fibers), friction modifiers (e.g., carbons, graphites, metals or alloys, solid lubricants, and abrasives), fillers (e.g., barium sulfate), and organic resin binders (e.g., phenolics and epoxies).

Sintered-metallic friction linings typically include, but are not limited to, bronze-based, iron-based, or aluminum-based composites. The type of sintered-metallic friction lining is usually designated by the typical constituents comprising the sintered-metallic composite which may include, but are not limited to, at least one of sintered-metals (e.g., copper, tin, iron, zinc, aluminum), fibers (e.g., metallic fibers and ceramic fibers), friction modifiers (e.g., carbons, graphites, metals or alloys, solid lubricants, and abrasives), and/or fillers.

Carbon/carbon composite friction linings typically comprise, but are not limited to, at least one of carbon fibers (e.g., derived from polyacrylonitirile, pitch, or rayon), friction modifiers (e.g., carbons, graphites, metals, ceramics, solid lubricants, and abrasives), fillers, and a carbonaceous matrix binder (e.g., derived from polymer impregnation and pyrolysis, chemical vapor infiltration, or a combination of both).

It is preferred that the types and amount of the constituents in the friction lining are chosen as to impart the desirable characteristic of the brake pad, including high or low coefficient of friction, high temperature stability, wear resistance, strength, and thermal conductivity. It is preferred that one skilled in the art who has the descriptions of the above listed types of friction linings, choose from among suitable, commercially available materials and select the appropriate friction lining for their particular application, insofar as the chosen friction lining is in accordance with the use of the resulting brake, environments in which the brake is used, and a method for controlling the brake, thereby to obtain the particular desired frictional characteristics. For example, in a racing application requiring aggressive deceleration, a preferred friction lining should exhibit a high coefficient of friction, low wear rates, high temperature stability, and adequate strength, of which a semi-metallic, sintered-metallic, or carbon/carbon composite friction lining would be preferred embodiments. A partial list of potentially suitable, commercially available friction linings are presented in Table 2.

TABLE 2

| Friction Material | Manufacturer | Compound |
| --- | --- | --- |
| Semi-Metallic | Hawk Performance | DTC-70 |
| Semi-Metallic | Performance Friction | 01 |
| Sintered-Metallic | Carbone Lorraine | RC5, RC6, RC8 |
| NAO | Wagner | Thermo-Quiet |
| Ceramic | Akebono | ProAct Ceramic |
| Carbon/Carbon | Across C/C | Carbon/Carbon |

The back plate 34 material used in the brake pad of the present invention can be a carbon/carbon composite as described herein and as is known in the art and/or it may be a commercially available carbon/carbon composite material (e.g., see last 4 products in Table 1). The carbon/carbon composite may be comprised of a family of materials having a carbonaceous matrix reinforced with carbon fibers and/or their precursor fibers, in which a variety of fibers, matrix precursor materials, and/or fillers may be used in the composite.

The carbon fibers used in the carbon/carbon composite back plate are as known in the art and may include, but are not limited to, at least one of polyacrylonitirile (PAN)-based, pitch-based, or rayon-based carbon fibers. The carbon fiber structure may be continuous (e.g., woven, non-woven, or unidirectional) or non-continuous (e.g., chopped or loose), where continuous means the fibers typically extend substantially the entire length of the structure and non-continuous usually means the fibers terminate within the structure itself.

The carbonaceous matrix of the carbon/carbon composite is as known in the art and may be obtained by liquid phase infiltration and subsequent thermal processing (e.g., pyrolysis) of an organic-based precursor (e.g., thermoplastic or thermoset polymer), or may be obtained by chemical vapor infiltration (CVO of a gas phase precursor of hydrocarbons that deposits carbon on the fibers when the gas is pyrolized. The carbonaceous matrix of the C/C composite may also be obtained from a combination of both processes, or a different process altogether. Further, processing conditions and heat treatments may be employed to impart specific properties of the carbon/carbon composite.

The carbon/carbon composite preferably has a bulk density of at least 1.3, 1.4, 1.5, 1.6, 1.7, 1.75, 1.8, or 1.85, g/cc. Preferably the fibers in the carbon/carbon composite are at least 20, 30, 40, 50, 60, 70, 80, 90 or 95%, (a) continuous and (b) woven and (c) oriented in the x-y direction and parallel to the x-y in-plane 40. Further information on carbon/carbon composites and how they are made can be obtained from WO 92/01648; U.S. Pat. Nos. 5,654,059; 4,297,307; 4,041,116; 6,521,152; 5,382,392; 5,744,075; 4,554,024; EP 0251301; U.S. Pat. Nos. 3,728,423; 4,457,967; 5,009,823; 5,439,080, the contents of all of which are incorporated herein by reference. Some carbon/carbon composite material may be carbonized at or about 900° C. (1,652° F.), and heat treatments up to 2800° C. (5,072° F.) can also be used.

It is noted that the carbon/carbon composite as described in the present invention differs from fiber reinforced thermosetting resin matrix composites primarily with respect to the matrix material utilized and the corresponding thermal stability and glass transition temperature (Tg) of the matrix material. A resin matrix typically comprises of a thermoset resin such as a phenolic, epoxy, or polyimide, which is a fully-formed and cured polymer. The thermal stability of most thermoset resins (e.g., phenolic, epoxy, or polyimide) is limited to approximately 300° C. (572° F.) at which point the resin will begin to thermally degrade and lose strength with exposure to elevated temperature over time. In addition, the glass transition temperature of most thermoset resins (e.g., phenolic, epoxy, or polyimide) seldom exceeds approximately 285° C. (545° F.) at which point the resin will begin to soften and lose strength with an increase in temperature over its glass transition point. In contrast, a carbonaceous matrix as previously described and embodied in the present invention has no glass transition temperature and will exhibit resistance to thermal degradation up to at least 500° C. (932° F.), 600° C. (1,112° F.), 800° C. (1,472° F.), 1,000° C. (1,832° F.), 1,500° C. (2,732° F.), 2,000° C. (3,632° F.), 2,500° C. (4,532° F.) or 2,800° C. (5,072° F.), in certain environments, and will not begin to oxidize in air until approximately 399° C. (750° F.).

It is also noted that a similar argument contrasting carbon/carbon composites to resin matrix composites may apply to thermoplastic-type resins, where the thermal stability and glass transition temperature of a thermoplastic is too low for embodiment in the present invention. Also, in order to further distinguish carbon/carbon composites from thermoset and thermoplastic resin matrix composites, it is known in the art that thermoset and thermoplastic resins may undergo pyrolysis when exposed to elevated temperatures at which point the resin will form a char. Typical char yields of thermoset and thermoplastic resins is between approximately 5 to 60 weight percent, meaning that the remaining 40 to 95 weight percent of the resin is vaporized. The resulting loss of material during pyrolysis means that the resin matrix composite structure may be less dense and therefore exhibit less strength than before pyrolysis. In contrast, a carbon/carbon composite will not lose material and strength due to pyrolysis because its carbonaceous matrix is formed by pyrolysis during processing.

The types, amount, orientation, and processing conditions of constituents used in, or precursor constituents used for, the carbon/carbon composite back plate will generally influence different characteristics of the composite. The different characteristics between the carbon/carbon composite materials refer to at least one of thermal properties (e.g., thermal conductivity and coefficient of thermal expansion), mechanical properties (e.g., interlaminar shear strength, compression modulus of elasticity, flexural strength, tensile strength, and hardness), oxidation characteristics (e.g., oxidation initiation temperature, rate of oxidation, and ash content), and/or other material properties (e.g., density and volume percent porosity).

In general, the mechanical properties of a carbon/carbon composite are most often influenced by the orientation, volume fraction, and properties of the fibers. As such, a continuous fiber structure typically provides the greatest amount of strength per unit of fiber volume, and so is preferred for the back plate portion. In addition, the strength of carbon/carbon composites generally increase with increasing amounts of fibers and may contain between 15 to 65 percent by volume of fibers, and preferably contain between 25 to 55 percent by volume of fibers, preferably having the aforementioned continuous form. Further, it is preferred that the direction of the continuous fibers should be oriented substantially parallel to the x-y in-plane 40 direction of the back plate as to increase, such as maximize, its resistance to bending under the forces imposed under braking (see FIG. 3).

Similarly, the thermal properties of a carbon/carbon composite may also be tailored by controlling the orientation, volume fraction, and properties of the fibers. Typically, a continuous fiber structure provides a higher thermal conductivity in the fiber direction than a non-continuous structure. Also, increasing the volume fraction of fibers can typically increase the thermal conductivity in the direction of those fibers. Therefore, it is preferred that a relatively higher volume fraction of continuous fibers are oriented in the x-y in-plane 40 direction as to encourage the anisotropic behavior necessary for thermal management of the carbon/carbon composite back plate, of which this preferred method is consistent with the aforementioned preferred method to improve mechanical properties. For example, the anisotropic material behavior can bias a majority of thermal energy dissipation of the brake pad assembly to be oriented in the x-y in-plane 40 direction of the back plate, or even in other desired directions.

It should be noted that processing conditions such as heat treatment (e.g., graphitization) of the carbon/carbon composite back plate can have a significant effect on its thermal conductivity (see Table 1), mechanical strength, and oxidation resistance. Graphitization of the C/C composite structure typically improves thermal conductivity in all directions (see FIG. 2). Therefore, it is preferred that one skilled in the art take into account the effect of thermally processing the carbon/carbon composite when making their design decision.

In one example embodiment, it is preferred that the through-plane 42 thermal conductivity (i.e., z-axis) of the carbon/carbon composite back plate be reduced, such as minimized, and that the ratio of in-plane 40 (x & y-axes) to through-plane 42 (z-axis) thermal conductivity of the carbon/carbon composite back plate be increased, such as maximized. In this respect, it is preferred that the through-plane 42 (z-axis) thermal conductivity of the back plate be relatively less than that of conventional metal back plates and the in-plane 40 (x & y-axes) thermal conductivity of the carbon/carbon back plate be between 0.1 to 1,000 W/m-K, or more preferably 5 to 300, or 12 to 250 W/m-K, such that the ratio of in-plane 40 (x & y-axis) to through-plane 42 (z-axis) thermal conductivity is increased, such as maximized. It is preferred that the through-plane 42 (z-axis) thermal conductivity be 0.5 to 60, or 1 to 50, or 5 to 25, W/m-K. The ratio of in-plane thermal conductivity to through-plane thermal conductivity is preferably at least 2, 3, 4, 5, or 6, or even more.

In one example, a majority of the carbon fibers of the reinforced carbon matrix composite can be oriented in a x-y in-plane direction 40 resulting in a structure where the thermal conductivity is at least 2 times greater in the x-y in-plane direction versus a z through-plane direction 42. For example, the resulting structure can have a thermal conductivity in the x-y in-plane direction 40 within a range of about 5 W/m-K to about 300 W/m-K, and a thermal conductivity in the z through-plane direction 42 within a range of about 1 W/m-K to about 50 W/m-K. In one example construction, a first portion of the carbon fibers can be oriented at an angle, such as generally perpendicular (or various other angles), relative to a second portion of the carbon fibers such that the first portion provides the structure with a thermal conductivity at least 2 times greater in one direction relative to that of the second portion. The orientation of the carbon fibers can be controlled in various manners, such as via bulk molding, needling, woven structure, etc. It is contemplated that any of the carbon fibers oriented in the various directions can include individual fibers having different portions thereof oriented in different directions, or even multiple fibers each being oriented in different directions. The various carbon fibers can be arranged in an array, pattern, randomly, etc. Other configurations and/or thermal conductivities are contemplated.

The back plate 34 is preferably the length, width, and lateral dimensions (shape) of a conventional back plate. In consideration of the back plate 34 size and structure, the back plate may be comprised of one or more fiber sheets, or it may be made from a bulk compound. It is preferred that the desired thickness of the back plate should be chosen as to exhibit a strength that will exceed anticipated compressive or flexural forces imposed thereon during braking (see FIG. 3). The desired thickness of the back plate should also be chosen as to exhibit improved thermal management, such that increasing the thickness of the back plate increases the available surface area perpendicular to the preferred in-plane 40 (x & y-axes) fiber direction by which improved forced air convection can occur. Preferably, the thickness of the carbon/carbon composite back plate will be between approximately 0.10 and 1.00 inches, preferably it is at least 0.1 or 0.2 or 0.3 inches, and preferably in some applications not more than 0.5, 0.6, 0.7, 0.8, or 0.9 inches, thick. It is noted that increasing the back plate thickness may require an equivalent reduction in the thickness of the friction lining, which can reduce the usable life of the brake pad.

Figure 3:
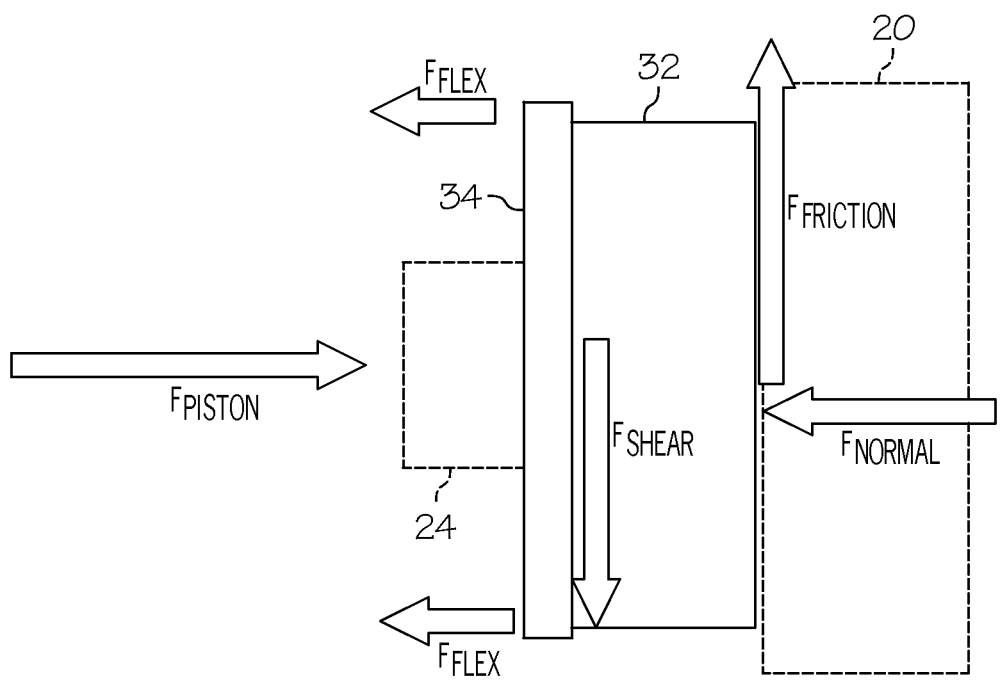
FIG. 3 is a side view of an example force diagram.

It is also preferred that the back plate 34 have some degree of three-dimensional orientation such that a percentage of fibers are oriented in the through-plane 42 (z-direction) as to impart a shear strength that exceeds any anticipated shear strength imposed thereon during braking (FIG. 3). This three-dimensional structure may be obtained in various manners, such as by needling stacks together, using a bulk molded compound, and/or by using a three-dimensional woven structure, etc. The percentage of z-directional through-plane 42 fibers should be lesser than the percentage of x-y directional in-plane 40 fibers such that the in-plane 40 thermal and mechanical properties of the composite are not compromised as a whole with respect to the given braking application and environment.

For the reason that the thermal and mechanical properties of the carbon/carbon composite back plate can be tailored by altering the type, amount, orientation, and processing history of its constituents, it is preferred that one skilled in the art take into account any and all design considerations regarding the back plate in order to select the appropriate carbon/carbon composite and back plate thickness for their particular application. The design considerations should ensure that the chosen carbon/carbon composite is in accordance with the use of the resulting brake, such as the environments in which the brake is used and the forces acting on the back plate during braking without failure. Additional design considerations can enable the brake to resist thermal degradation at the elevated temperatures encountered during braking while exhibiting anisotropic behavior thereby to impart particular desired thermal management characteristics. Thermal management, in this context, generally means to preferentially conduct heat away from the caliper pistons by increasing the ratio of in-plane 40 thermal conductivity to through-plane 42 thermal conductivity. A partial list of suitable, commercially available carbon/carbon composite materials is displayed in the last 4 items of Table 1.

The present invention also relates to preferred methods of making the brake pad assembly 50 (also illustrated in various examples identified as 50A-50G) of the present invention comprising a friction lining 32 and carbon/carbon composite back plate 34. As shown in the various examples of Methods A, B, C, D, E, F, and G described herein, the friction lining 32 can be coupled to the carbon/carbon composite back plate 34 by one or more coupling structures that can be removable or non-removable. In a first example, the friction lining 32 is a first composition comprising of a resin-bonded composite with filler material; or in a second example, the friction lining 32 is a second composition comprising of a sintered-metallic composite with filler material; or in a third example, the friction lining 32 is a third composition comprising of a carbon/carbon composite with or without filler material. The back plate 34 is provided as a fourth composition comprising of a carbon fiber reinforced carbon matrix composite.

The first composition (resin-bonded friction lining, referred to as "Material 1") may be optionally molded under temperature and pressure with subsequent heat treatment to form a friction lining pad in the desired shape and thickness; or a commercially available resin-bonded friction lining pad may be obtained and machined into the desired shape and thickness. The second composition (sintered-metallic friction lining, referred to as "Material 2") may be optionally sintered under temperature and/or pressure to form a friction lining pad in the desired shape and thickness; or a commercially available sintered-metallic friction lining pad may be obtained and machined into the desired shape and thickness. The third composition (carbon/carbon composite friction lining, referred to as "Material 3") may be optionally formed by polymer infiltration and pyrolysis or chemical vapor infiltration along with temperature and/or pressure to form the carbonaceous structures; or a commercially available carbon/carbon composite may be obtained and machined into the desired shape and thickness. The fourth composition (carbon/carbon back plate, referred to as "Material 4") may be commercially obtained in the desired shape and thickness, or it may be obtained as a block or sheet and machined to the desired shape and thickness.

As previously described, one preferred embodiment of the fourth (carbon/carbon back plate) composition is a carbon/carbon composite in which the types and amounts of its constituents are generally chosen to impart strength to the back plate necessary to better withstand the compressive, flexural, and shear forces placed upon it during braking (see FIG. 3). The types and amounts of its constituents are generally chosen to preferentially conduct heat in the x-y in-plane 40 direction away from the caliper pistons 24. As such, it is preferred that the fourth composition is formed from at least one sheet of continuous fibers, where the fibers are oriented substantially parallel to the x-y in-plane 40 direction of the back plate. The sheet of fibers can be provided in various manners, such as via bulk molded compound, by needling stacks together, and/or by using a three-dimensional woven structure, etc. Orienting the fibers substantially parallel to the x-y in-plane 40 can increase, such as optimize, the back plate's resistance to flexural failure under the forces imposed on it during braking. Also, orienting the fibers substantially parallel to the x-y in-plane 40 direction can increase, such as optimize, the back plate's ability to conduct heat away from the pistons in the x-y in-plane 40 direction.

The first composition (resin-bonded friction lining) and fourth composition (carbon/carbon back plate) may be combined together in various removable or non-removable manners, such as via non-removable coupling structure. In one preferred method, the fully-formed first composition is assembled with the fully-formed fourth composition by a secondary operation such as mechanical fastening (e.g., riveting, screwing, or bolting) or adhesive bonding. In another preferred method, the fully-formed fourth composition is combined with the first composition in situ (i.e., an in situ process) during the molding (forming and curing) of the first composition. This in situ method of combining Material 1 to Material 4 may be accomplished by integral molding, mechanical retention, or liquid phase infiltration and adhesion. It is also recognized that a combination of secondary operations and/or in situ methods, generally as known in the art, may be utilized in order to form a brake pad assembly having a friction lining 32 and a back plate 34. It is contemplated that any or all of the methods (i.e., Methods A-G) can be used alone or in combination.

Figure 4A:
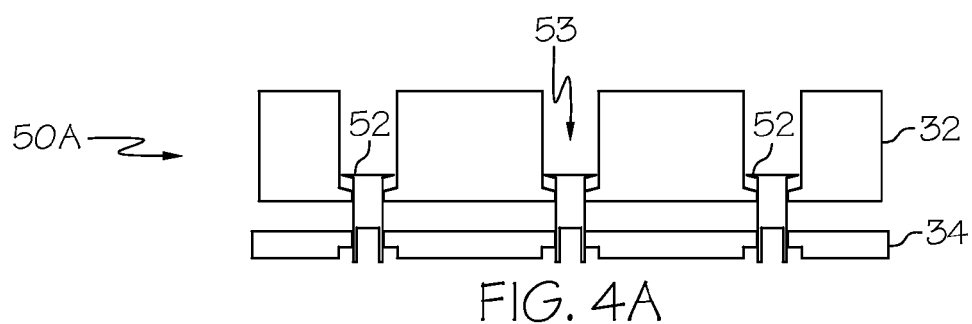
FIG. 4A is an exploded cross-sectional view of an example brake pad assembly.

In one example, mechanical fastening (Method A) in the form of riveting may be performed by disposing a plurality of rivets at specified locations through the brake pad (FIG. 4A). Each rivet 52 can comprise a rivet head disposed in a counter bored friction pad hole 53. A shoulder portion can be disposed in and fill a small diameter portion of the friction pad hole, a shank portion of lesser diameter than the shoulder portion can be disposed in a back plate hole, and a tubular tip portion can extend beyond said back plate and be adapted to be deformed, such as rolled over or crushed, to secure the friction lining 32 to the back plate 34. In one preferred form, the rivet is an eyelet of substantially uniform wall thickness, wherein the length and diameter of the rivet shoulder are substantially the same as the length and diameter of the small diameter of the brake pad hole 53. It is noted that since a plurality of rivets 52 may be used for the brake pad, the total mass of the pad may increase, which may potentially reduce some of the mass reduction benefit of the present invention.

In another example, adhesive bonding (Method B), as defined in the context between the first composition (resin-bonded friction) and the fourth composition (C/C back plate), may be performed by applying an adhesive 54, such as an adhesive film or laminate, between the fully-formed friction lining 32 and back plate 34 (FIG. 4B) and then optionally applying heat and/or pressure to bond the part. For example, the adhesive film 54 may be applied by using a laminate cut to size, applying a liquid form, or may be applied in powder form. The adhesive material may be of either a thermosetting or thermoplastic type or a material combining the characteristics of both types. One preferred adhesive is a thermosetting epoxy, phenolic, or modified-phenolic that can withstand thermal degradation during in-service use. The adhesive material is preferred to be of the heat bondable type, this term being understood to mean an adhesive in which the bonding is directly activated by heat or accelerated by heat to cure the adhesive or to soften it for bonding purposes. The amount of heat and/or pressure necessary to bond the part should preferably be defined by the manufacturer of the adhesive in accordance with the type and properties of the adhesive being utilized. The adhesive manufacturer may also utilize heat treatment of the adhesive in order to promote, such as ensure, a uniform cross-link density of the adhesive member. This heat treatment is preferably in accordance with the recommendation of the adhesive supplier. A partial list of suitable, commercially available sources of adhesives is contained in Table 3.

TABLE 3

| Adhesive Type | Manufacturer | Product |
| --- | --- | --- |
| Nitrile Phenolic | 3M | Scotch-Weld AF30 |
| Phenolic | SI Group | HRJ-14209 |
| Modified Epoxy | 3M | Scotch-Weld AF555 |
| Epoxy | 3M | Scotch-Weld AF500 |

Figure 4B:
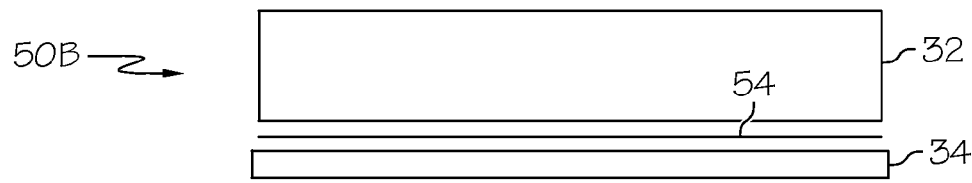
FIG. 4B is an exploded cross-sectional view of another example brake pad assembly.
Figure 4C:
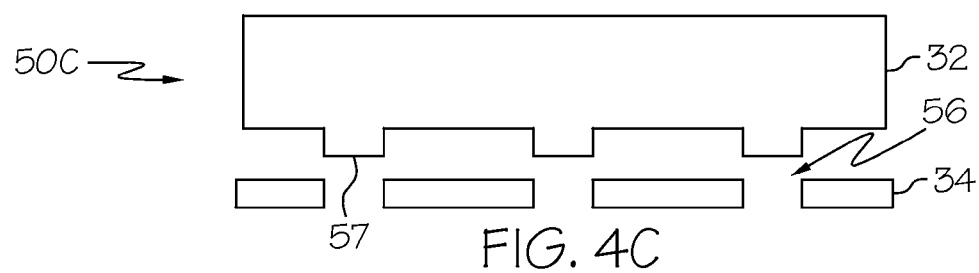
FIG. 4C is an exploded cross-sectional view of another example brake pad assembly.
Figure 4D:
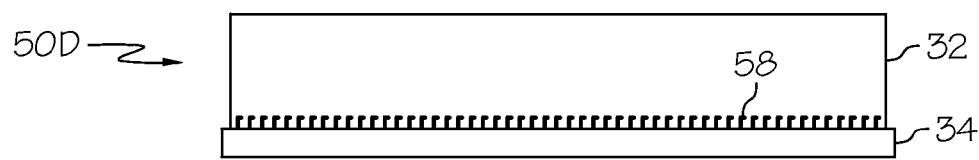
FIG. 4D is a cross-sectional view of yet another example brake pad assembly.
Figure 4E:
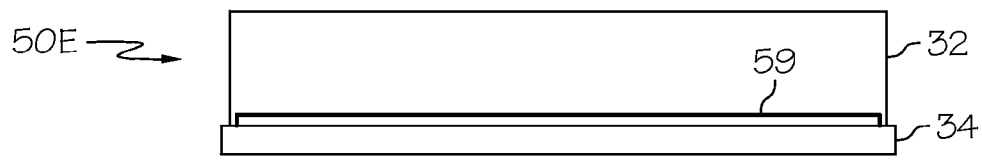
FIG. 4E is a cross-sectional view of yet another example brake pad assembly.

In another example, molding (Method C), as defined in the context between the first composition (resin-bonded friction) and the fourth composition (C/C back plate), is taken to mean combining the fully-formed back plate 34 with the friction lining 32 material in situ, while the friction lining material is being formed and cured under temperature and pressure. Under Method C, molding can take several forms: (1) molding may include attachment via an adhesive 60 in which a thermoset resin laminate, film, or powder is placed between Material 1 and Material 4 and further softens, flows, and cures to form a bond (FIG. 4G); or (2) molding may include attachment via an integral mold hole 56 in the back plate in which the friction material is extruded 57 and formed into this hole (FIG. 4C); or (3) molding may include attachment via mechanical retention 58 in which the friction material is formed and secured around rigid structures in the back plate 34 (FIG. 4D); or (4) molding may include attachment via mechanical retention to an intermediate layer 59 (e.g., metal shim) in which the intermediate layer is first attached to the carbon/carbon back plate 34 (Material 4) by means of mechanical fastening, adhesive bonding, brazing, or welding, and then the friction material is formed and secured around rigid structures in the intermediate layer 59 (FIG. 4E). In the case of Method C, the amount of temperature, pressure, and time required to mold the part should be defined by the manufacturer of the friction lining material in accordance with the necessary molding cycle for the friction lining.

In yet other examples, various combinations of methods can be used together. For example, mechanical fastening (Method A) may be used in conjunction with adhesive bonding (Method B) to promote a good bond (see FIG. 4F). Other combinations are also contemplated. Various other combinations of any of the methods can be used.

In another example embodiment, the second (sintered-metallic friction lining) composition may be combined with the fourth composition (carbon/carbon back plate) in various removable or non-removable manners. In one preferred method, the fully-formed second composition is assembled with the fully-formed fourth composition by a secondary operation such as mechanical fastening (e.g., riveting, bolting, or screwing) or adhesive bonding (e.g., polymer adhesion, brazing, or welding). In another preferred method, the fully-formed fourth composition is combined with the second composition in situ during the sintering of the second composition. This in situ operation of combining Material 2 with Material 4 may be accomplished by integral molding, mechanical retention, or liquid phase infiltration and adhesion. It is also recognized that a combination of secondary operations or in situ methods, generally as known in the art, may be utilized in order to form a brake pad assembly having a friction lining 32 and back plate 34.

The first and second compositions may utilize different techniques for coupling to the fourth composition. Mechanical fastening in the form of riveting of the second composition (sintered-metallic friction) to the fourth composition (C/C back plate) may be performed generally in the same manner as described in Method A (FIG. 4A). Adhesive bonding of the second composition to the fourth composition may be performed generally in the same manner as described in Method B (FIG. 4B), or it can differ from the aforementioned adhesive bonding, such that the adhesive 54 used to bond the second composition to the fourth composition may be a braze or weld (FIG. 4B, Method D). The method used to braze or weld the sintered-metallic lining to the carbon/carbon composite back plate may utilize a braze paste, a weld, and/or liquid phase sintering. In one example, this adhesive bond (Method D) may be formed by allowing the liquid metal from the braze or weld to alloy with the friction material and infiltrate into the porous C/C back plate to form a bond. Alternatively, the adhesive bond (FIG. 4E, Method D) may be formed by allowing the liquid metal from the braze or weld to alloy with the friction material and then alloy with an intermediate layer (e.g., metal shim) that has been first attached to the carbon/carbon back plate by means of mechanical fastening, adhesive bonding, brazing, or welding.

Sintering (Method E), as defined in the context between the second composition (sintered-metallic friction) and the fourth composition (C/C back plate), is taken to mean combining the fully-formed back plate 34 to the friction lining 32 material in situ, while the friction lining material is being sintered under temperature and/or pressure. In the context of Method E, sintering can take several forms: (1) sintering may include attachment via an integral mold hole 56 in the back plate in which projections 57 of the friction material are interlocked with the integral mold holes 56 of the back plate 34 (FIG. 4C); or (2) sintering may include attachment via mechanical retention 58 in which the friction material is formed and secured around rigid structures in the back plate 34 (FIG. 4D); or (3) sintering may include attachment via mechanical retention to an intermediate layer 59 (e.g., metal shim) in which the intermediate layer is first attached to the carbon/carbon back plate 34 (Material 4) by means of mechanical fastening, brazing, or welding, and then the friction material is formed and secured around rigid structures in the intermediate layer 59 (FIG. 4E); or (4) sintering may include attachment via bonding, such as a penetrating bond through intimate contact of the sintered-metallic lining 32 to the carbon/carbon back plate 34 by means of liquid phase sintering of the friction lining and subsequent infiltration of this liquid phase melt 60 into the porous carbon/carbon structure forming a bond (FIG. 4G); or (5) sintering may include attachment via bonding of the sintered-metallic lining 32 to an intermediate layer 59 (e.g., metal shim) in which the intermediate layer is first attached to the carbon/carbon back plate 34 by means of mechanical fastening, brazing, or welding, and then the friction material forms an alloy and secure bond with this intermediate layer during the process of liquid phase sintering (FIG. 4E). In the case of Method E, the amount of temperature, pressure, and time required to form and sinter the part should be defined by the manufacturer of the friction lining material in accordance with the necessary sintering cycle for the friction lining. In yet other examples, as before, various combinations of methods can be used together. For example, the adhesive method (Method D) may be used in conjunction with mechanical fastening (Method A) to promote a good bond. Other combinations are also contemplated.

In yet another example embodiment, the third composition (carbon/carbon friction lining) may be combined with the fourth composition (carbon/carbon back plate) in various removable or non-removable manners. In one preferred method, the fully-formed third composition is assembled with the fully-formed fourth composition by a secondary operation such as mechanical fastening (e.g., riveting, bolting, or screwing) or adhesive bonding (e.g., polymer adhesion or polymer-infiltration-pyrolysis (PIP) adhesion). In another preferred method, the fully-formed fourth composition may be combined with the third composition in situ during the carbonization (i.e., forming of the carbonaceous matrix) of the third composition. This in situ combination may be accomplished by integral molding, mechanical retention, or liquid phase infiltration and adhesion. It is also recognized that a combination of secondary operations or in situ methods, generally as known in the art, may be utilized in order to form the brake pad assembly having a friction lining 32 and a back plate 34.

The first, second, and third compositions may utilize different techniques for coupling to the fourth composition. Mechanical fastening in the form of riveting of the third composition (C/C friction) to the fourth composition (C/C back plate) may be performed generally in the same manner as described in Method A (FIG. 4A). Adhesive bonding of the third composition to the fourth composition may be performed generally in the same manner as described in Method B (FIG. 4B); or it can differ from the aforementioned adhesive bonding, such that the adhesive used to bond the third composition to the fourth composition may be an organic-based precursor (e.g., thermoplastic (e.g., pitch) or thermoset polymer) that is softened with heat allowing it to flow, optionally with the aid of pressure, into the porous networks of Material 3 and Material 4 and then is pyrolyzed to form a carbonaceous binder 54 that secures the third composition to the fourth composition with relatively increased resistance to thermal degradation (FIG. 4B, Method F).

Figure 4F:
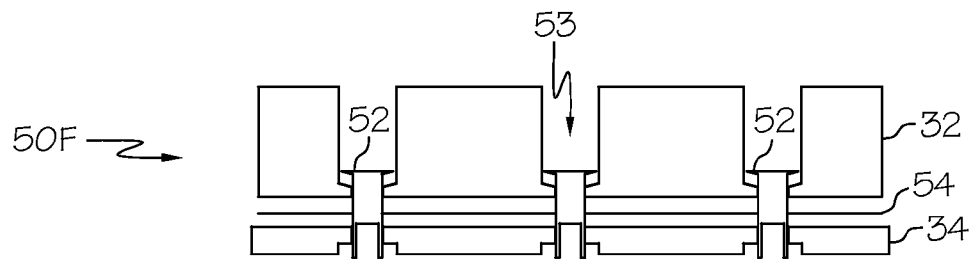
FIG. 4F is an exploded cross-sectional view of still yet another example brake pad assembly.
Figure 4G:
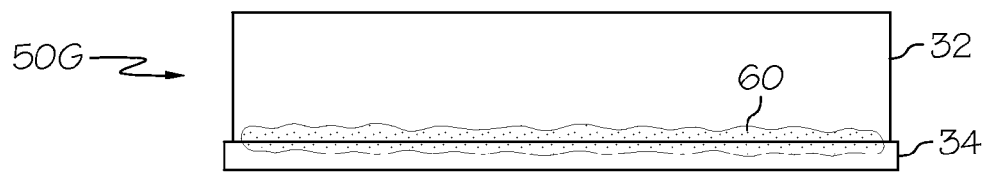
FIG. 4G is a cross-sectional view of still yet another example brake pad assembly.
Figure 4H:
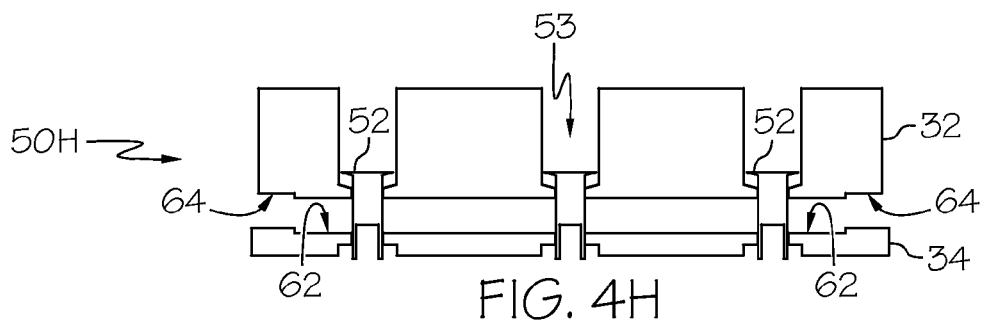
FIG. 4H is an exploded cross-sectional view of still yet another example brake pad assembly including example abutment surfaces.

Carbonizing (Method G), as defined in the context between the third composition (carbon/carbon friction lining) and the fourth composition (C/C back plate), is taken to mean combining the fully-formed back plate 34 to the friction lining material 32 in situ, while the friction lining material is being formed under temperature and/or pressure or during densification and/or pyrolysis. In the context of Method G, carbonizing can take several forms: (1) carbonizing may include attachment via an integral mold hole 56 in the back plate in which the friction material is extruded and formed 57 into this hole 56 (FIG. 4C); or (2) carbonizing may include attachment via mechanical retention 58 in which the friction material 32 is formed and secured around rigid structures in the back plate 34 (FIG. 4D); or (3) carbonizing may include attachment via mechanical retention to an intermediate layer 59 (e.g., metal, ceramic, or composite shim) in which the intermediate layer is first attached to the carbon/carbon back plate 34 (Material 4) by means of mechanical fastening, adhesive bonding, brazing, or welding, and then the friction material 32 is formed and secured around rigid structures in the intermediate layer 59 (FIG. 4E); or (4) carbonizing may include attachment via bonding, such as a penetrating bond through intimate contact of the carbon/carbon friction lining to the carbon/carbon back plate 34 by means of liquid phase polymer flow of the friction lining binder into the porous carbon/carbon back plate structure and subsequent pyrolysis of the polymer binder to form a carbonaceous bond (FIG. 4G). In the case of Method G, the amount of temperature, pressure, and time required to form and carbonize the part should be defined by the manufacturer of the friction lining material in accordance with the necessary carbonization cycle for the friction lining. It is also contemplated that if the friction manufacturer utilizes chemical vapor infiltration to form Material 3, that the carbon deposition forming the matrix may also be utilized to form a bond (in situ) to the C/C back plate (Material 4). In yet other examples, as before, various combinations of methods can be used together. For example, the adhesive method (Method F) may be used in conjunction with mechanical fastening (Method A) to promote a good bond. It is contemplated that the friction lining 32 and back plate 34 can be carbonized in separate operations (i.e., independently), or can be carbonized together, such as in one manufacturing step. Other combinations are also contemplated.

It is noted that where combinations of adhesive bonding, molding, sintering, carbonizing and/or mechanical fastening are to be utilized, the order of operation should be performed such that one method may follow another. For example, the combination of adhesive bonding and riveting methods should be performed such that the former (adhesive) is accomplished first, followed by the latter (riveting) second, although various other combinations are possible.

It is also noted that although the above-described adhesive bonding and mechanical fastening between the first composition and fourth composition may be preferred, other methods could be employed if desired. Also, other means for mechanical fastening, applying the adhesive, molding, sintering, or carbonizing may be employed. Regardless, the various preferred methods described herein are not intended to limit the invention to any particular method. Rather any appropriate method, such as is known in the art, may be employed to form the friction lining and back plate structure according to the present invention. It is therefore recommended that those skilled in the art that have the benefit of this description will be able to choose from among suitable materials and select the appropriate securing strategy for their particular situation.

By way of examples, appropriate brake pads, each comprising a friction lining and back plate, embodying two separate examples of the present invention were manufactured and tested and will be described in detail herein. It is to be understood that the present inventions are not limited to these examples. For example, various other method steps, materials, structures, procedures, orders of steps, etc. are contemplated.

EXAMPLE 1

Figure 6:
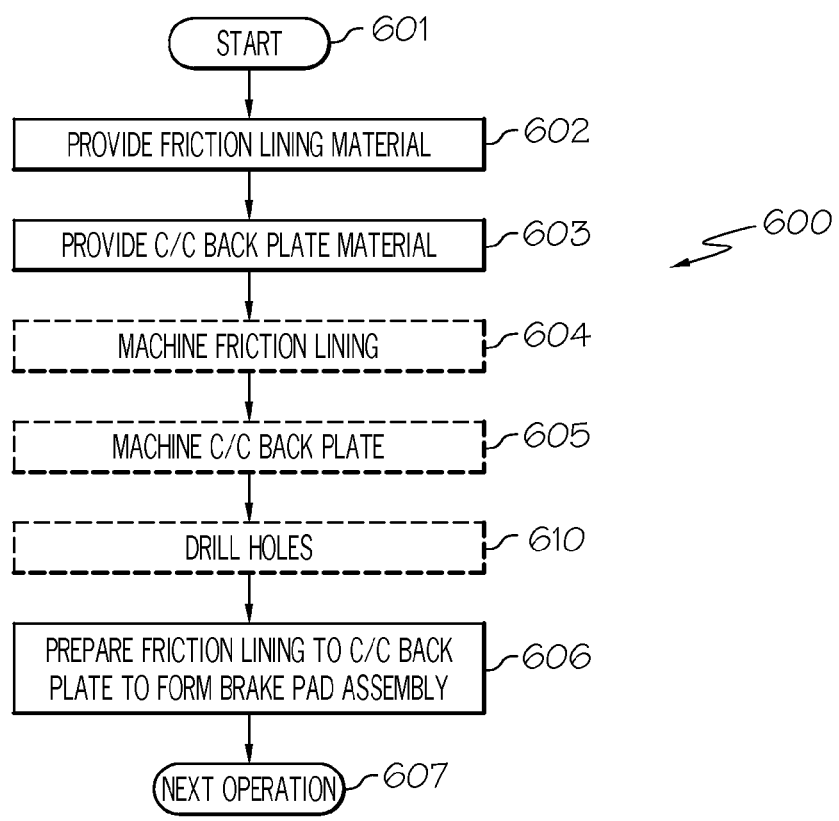
FIG. 6 is an example process flow map of an example general manufacturing process.
Figure 9:
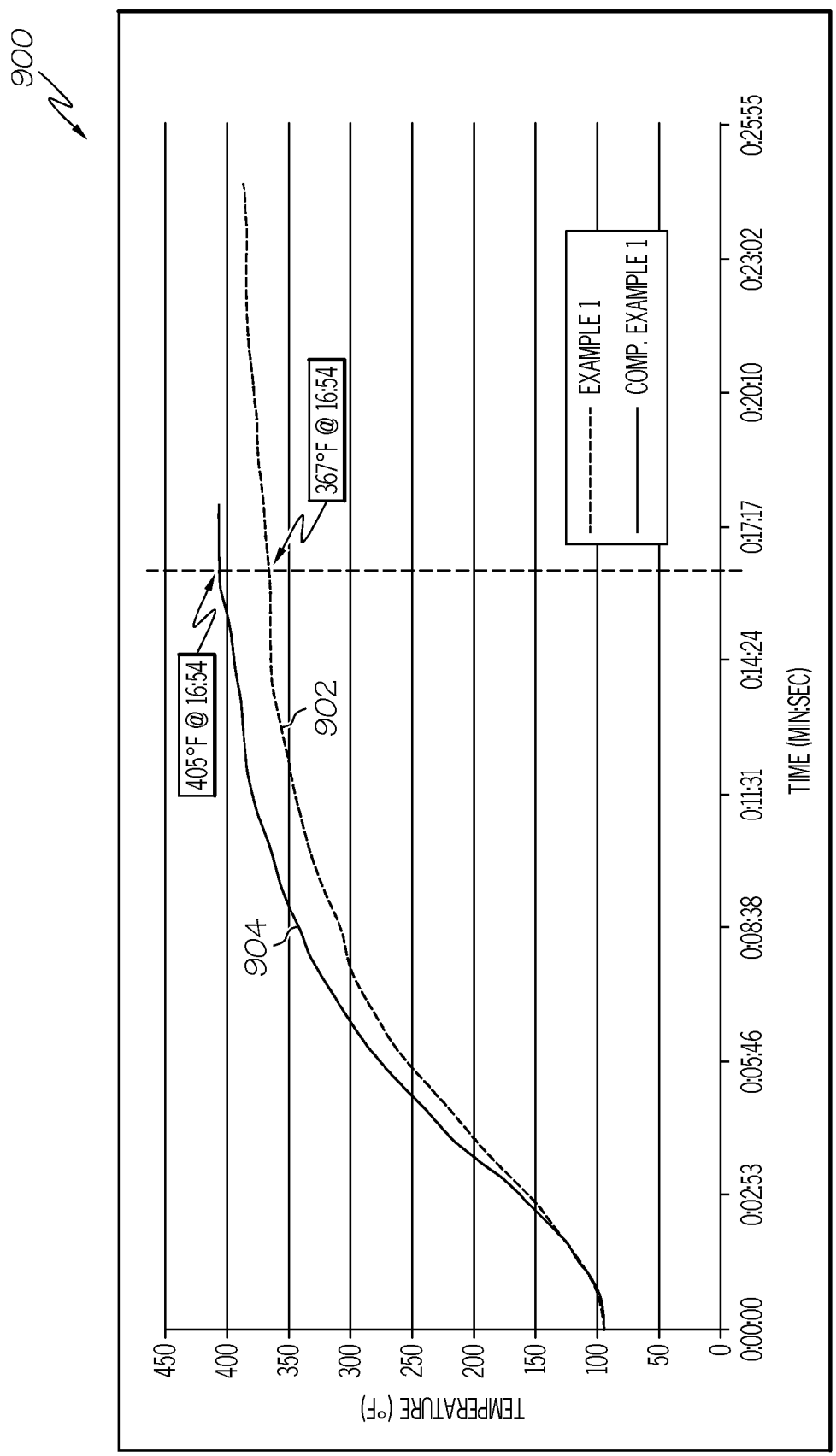
FIG. 9 is a graph illustrating example dynamometer data of the caliper brake fluid temperature versus time.

The herein described example brake pad assembly was manufactured (see FIG. 6) in accordance with an automotive racing application in mind. The particular racing application experiences relatively high speeds and requires aggressive deceleration. Therefore, the properties desired of the brake pad in this application generally include: high coefficient of friction, good wear resistance, high-temperature frictional stability, low mass, ability to withstand the forces induced under braking, ability to resist thermal degradation at elevated temperatures, and preferential conduction of heat away from the caliper pistons. The example method steps are illustrated in FIG. 6 in process flowchart 600 that begins at 601. A simulation of these conditions was tested on an inertia brake dynamometer with the parameters as described in Table 4 and test results provided in Table 5, and FIG. 9.

TABLE 4

| Item | Testing Condition |
|---|---|
| Testing Method | Deceleration test under constant deceleration rate |
| Inertial Mass | 43.376 slug-ft$^2$ |
| Rolling Radius | 13.750 in. |
| Brake Rotor | Grey Cast Iron, Brembo 099229.10 |
| Brake Pad Shape | Hawk Performance HB221 |
| Brake Pad Area | 12.201 in$^2$ |
| Caliper Type | Brembo opposing 4-piston |
| Piston Area per side | 4.115 in$^2$ |
| Effective Radius | 5.322 in. |
| Initial Velocity | 1830 rpm (simulated 150 mph) |

TABLE 4-continued

| Item | Testing Condition |
|---|---|
| Final Velocity | 1100 rpm (simulated 90 mph) |
| Deceleration Rate | 0.75 g |

TABLE 5

| | Friction Lining Material | Back Plate Material | Rotor Material | Rotor Initial Weight (g) |
|---|---|---|---|---|
| Ex. 1 | DTC-70 | C/C | Grey Cast Iron | 8352.7 |
| Comp. Ex. 1 | DTC-70 | 1010 Steel | Grey Cast Iron | 8349.5 |

| | Pads Avg. Initial Weight (g) | Coefficient of Friction | Caliper Temperature [° F. @ Time (min:sec.)] |
|---|---|---|---|
| Ex. 1 | 453.1 | 0.5 | 367° F. @ 16:54 |
| Comp. Ex. 1 | 792.0 | 0.5 | 405° F. @ 16:54 |

At step 602, a commercially available set of semi-metallic brake pads (Hawk Performance HB221U 1.17) was obtained in the desired frictional shape and approximate thickness. The friction linings 32 from three brake pads were separated from their metal back plate by way of band-sawing. At step 604, each friction lining was then (optionally) rotary surface ground (i.e., Blanchard ground) flat such that the outer planar surfaces of the brake pad were approximately parallel. After grinding, the overall thickness of each friction lining was approximately 0.60 inches.

At step 603, a commercially available carbon/carbon composite sheet was obtained 602 in the approximate desired thickness (BlackHawk 31CL). The carbon/carbon composite comprised of approximately 31 volume percent non-continuous fibers generally oriented parallel to the x-y in-plane 40 direction. Typical properties of the BlackHawk 31CL carbon/carbon composite are listed in Table 1. Pieces in the desired back plate shape were water-jet cut out of the carbon/carbon composite material. At step 605, each back plate 34 was then (optionally) Blanchard ground flat such that the outer planar surfaces of the back plate were approximately parallel and the overall thickness was approximately 0.20 inches. At step 606-607, the friction lining 32 was prepared to be combined with the back plate 34.

Figure 5:
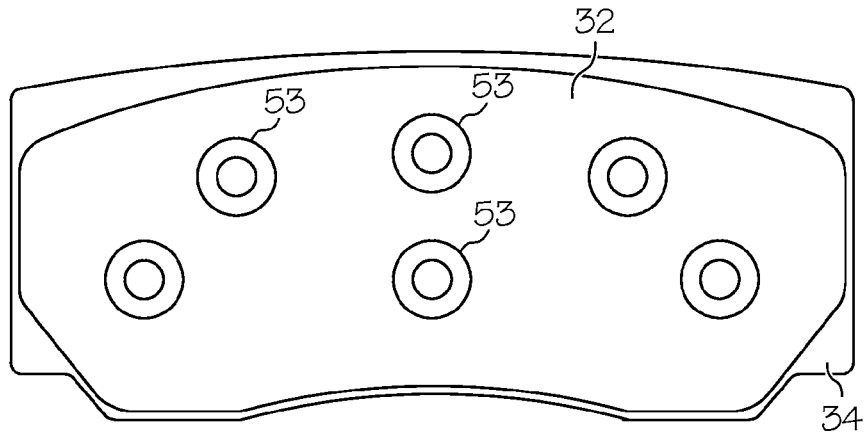
FIG. 5 is a front view of an example rivet pattern and shape of the brake pad in FIG. 4A.

Optionally, at step 610, counter-bored holes were machined at six locations (FIG. 5) in each of the friction linings 32 and back plates 34, such that the holes of the friction lining and back plate could be aligned during riveting to form the desired shape and frictional profile of the brake pad. The counter-bored holes were machined to receive rivets (or other fastening structure). It is to be understood that the rivets (or other fastening structure) can alternatively be located variously about the brake pad.

Figure 7A:
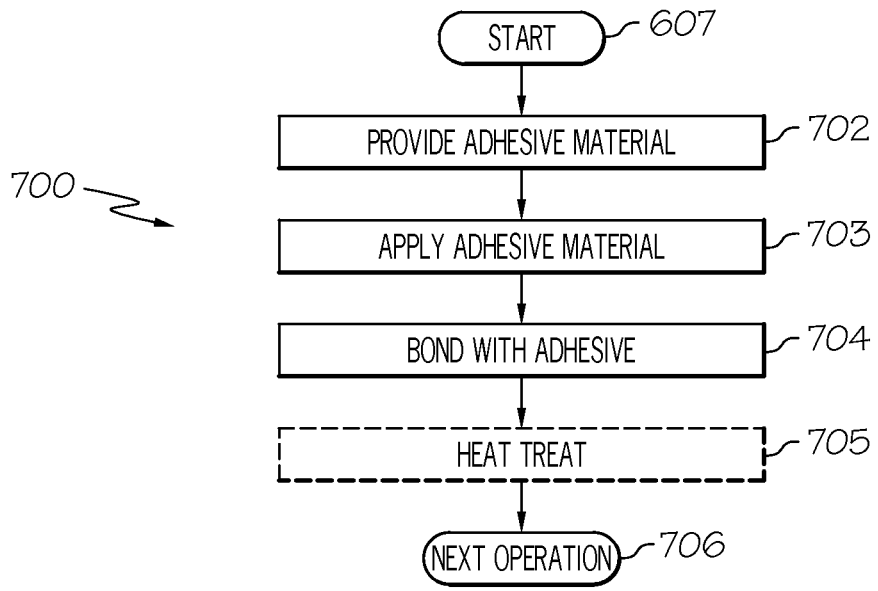
FIG. 7A is an example process flow map of an example adhesive process.

Turning to the process flowchart 700 of FIG. 7A, the method continues from step 607. At step 702, pieces from an adhesive laminate of nitrile phenolic (3M AF30) were cut from a sheet in the desired shape corresponding to the back plate shape. The thickness of the adhesive laminate was approximately 0.01 inches. At step 703, for each part, the adhesive 54 was placed in between the friction lining 32 and the carbon/carbon composite back plate 34. The components were oriented in such a way that: (1) counter sunk hole(s) of the back plate 34 (if present from step 610) were opposite the adhesive laminate 54 (FIG. 4F); (2) the laminate generally shape matched the back plate shape; (3) the friction lining 32 was placed in the correct position as to provide the desired friction profile with respect to the back plate 34 and so that the rivet holes of the friction lining and back plate were aligned (FIG. 4F); and (4) the counter sunk holes of the friction lining 32 (if present from step 610) were opposite the adhesive laminate 54 (FIG. 4F), thus forming a pre-assembled brake pad structure.

At step 704, each pre-assembled brake pad structure was then placed on a pre-heated platen press for bonding the adhesive to the friction lining 32 and back plate 34. The platen press contained two parallel platens which were pre-heated to 400° F. platen surface temperature. Within one minute of placing the pre-assembled brake pad structure on the bottom hot platen (back plate on bottom), a pressure of 5 tons was applied for 15 minutes, thus forming an adhered brake pad structure.

At step 705, each adhered brake pad structure was (optionally) heat treated in a forced air oven according to a specific profile. The oven profile consisted of ramping temperature from 250° F. to 400° F. at 30° F. per hour and then soaking the part(s) at 400° F. for one hour. The oven was then allowed to cool to ambient temperature. At step 706, the brake pad assembly 50 can be finished, or may be further processed. While the steps in flowchart 700 are generally directed to providing an adhesive, it is to be understood that a similar process can be utilized to braze or weld the sintered-metallic friction lining 32 to the carbon/carbon composite back plate 34 as described herein.

Figure 8:
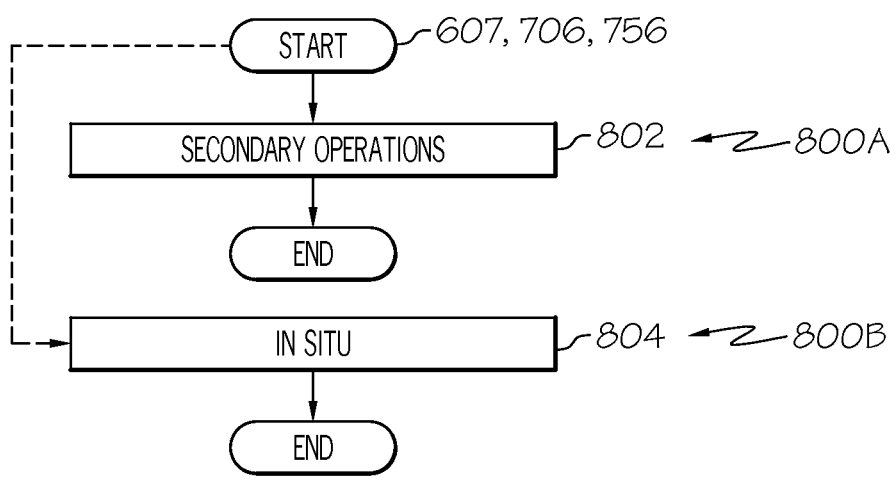
FIG. 8 is an example process flow map of an example secondary operation or in situ process.

Turning to the process flowchart 800A of FIG. 8, the method can continue from step 706. After the heat treat cycle step 705, each adhered brake pad structure was further coupled with a secondary operation 802, such as being riveted with six rivets in accordance with Method A (FIG. 4F), thus forming the brake pad assembly as embodied in the present invention. The overall thickness of each brake pad assembly measured approximately 0.81 inches with an overall weight of approximately 453 grams.

In addition or alternatively, the method can continue from step 706 to other process steps that may not include secondary operation(s). For example, turning to the process flowchart 800B of FIG. 8, the method can continue from step 607 or 706. The back plate 34 can be combined with the friction lining 32 material in situ 804, such as via molding or the like, while the friction lining material is being formed and cured under temperature and pressure (in the context between the first composition and the fourth composition); or while the friction lining material is being sintered under temperature and/or pressure (in the context between the second composition and the fourth composition); or while the friction lining material is being carbonized under temperature and/or pressure (in the context between the third composition and the fourth composition). The various in situ processes 804 may include attachment via a projection 57 engaging an integral mold hole 56 (FIG. 4C) or via mechanical retention 58 (FIG. 4D), and as such the method steps can include additional steps (e.g., providing mold holes, projections, mechanical retention structure, etc.) as may be needed to perform the molding operation.

Figure 7B:
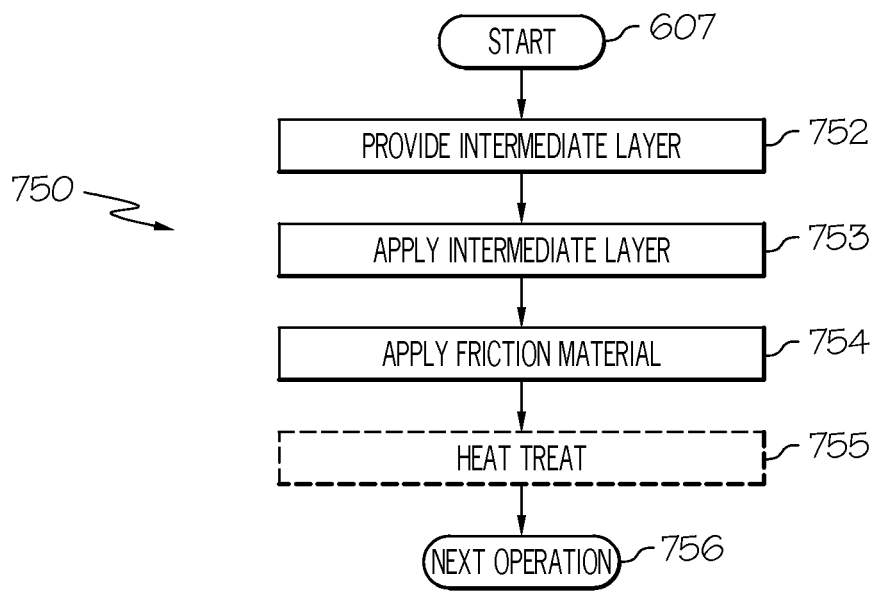
FIG. 7B is an example process flow map of an example intermediate layer process.

In addition or alternative to the use of an adhesive, the friction lining 32 can be coupled to the back plate 34 via an intermediate layer 59 (e.g., metal shim or the like). Turning to the process flowchart 750 of FIG. 7B, the method continues from step 607. At step 752, one or more intermediate layer 59 pieces can be provided, such as cut from a sheet (e.g., sheet metal for a metal shim, or various other materials) in the desired shape corresponding to the back plate shape. At step 753, for each part, the intermediate layer 59 can be placed onto the carbon/carbon composite back plate 34. The components can be oriented in such a way that: (1) counter sunk hole(s) of the back plate 34 (if present from step 610) are opposite the those of the intermediate layer 59; (2) the intermediate layer 59 generally shape matches the back plate 34 shape; and (3) the intermediate layer 59 is placed in the correct position as to provide the desired friction profile with respect to the back plate 34. The intermediate layer 59 can be removably or non-removably coupled onto the carbon/carbon composite back plate 34.

At step 754, the brake pad structure can then be assembled by applying the friction material 32 via an in situ process. For example, molding or carbonizing may include attachment via mechanical retention to an intermediate layer 59 (e.g., metal shim) in which the intermediate layer is first attached to the carbon/carbon back plate 34 (Material 4) by means of mechanical fastening, adhesive bonding, brazing, or welding, and then the friction material 32 is formed and secured around rigid structures in the intermediate layer 59. Similarly, sintering may include attachment via bonding of the sintered-metallic lining 32 to an intermediate layer 59 (e.g., metal shim) in which the intermediate layer is first attached to the carbon/carbon back plate 34 by means of mechanical fastening, brazing, or welding, and then the friction material forms an alloy and secure bond with this intermediate layer during the process of liquid phase sintering. The brake pad assembly can be coupled under various suitable temperature and/or pressure conditions.

At step 755, each adhered brake pad structure can be (optionally) heat treated in a forced air oven according to a specific profile. The oven profile consisted of ramping temperature from 250° F. to 400° F. at 30° F. per hour and then soaking the part(s) at 400° F. for one hour. The oven can be allowed to cool to ambient temperature. At step 756, the brake pad assembly 50 can be finished, or may be further processed, such as via the steps of flowchart 800. For example, secondary operation(s) 802, such as rivets, can be applied. While the steps in flowchart 750 are generally directed to providing an intermediate layer 59, it is to be understood that a similar process can be utilized to braze or weld the sintered-metallic friction lining 32 to the carbon/carbon composite back plate 34 as described herein.

Further, it is possible to assemble the brake pad structure without the adhesive (or brazing, etc.) provided in steps 702-706 (i.e., see FIG. 4A). In one example, the method can proceed from step 607 directly to step 802, 804, etc., and may even involve various combinations of the steps 802, 804, etc. In addition or alternatively, various other structures can be included in the brake pad assembly, such as wear sensors, temperature sensors, wear indicators, coupling structure, etc.

An inertia dynamometer brake test was also conducted to ensure that the brake pad assembly embodying the present invention could meet the strength and thermal management requirements for e.g., a high-performance automotive race vehicle. The test parameters of this dynamometer procedure are listed in Table 4. During this evaluation, temperatures of the disc brake components were monitored versus time, including the brake pad temperatures, the rotor temperature, and specifically the brake fluid temperature which was monitored via an embedded thermocouple in the brake bleeder screw 22. The results of this test are illustrated in a graph 900 in FIG. 9. The results (see dashed line 902) showed that caliper fluid temperature reached approximately 367° F. within approximately 17 minutes (25 engagements) and the average back plate temperature recorded approximately 704° F. at the same time. The dynamometer simulation continued a total of 250 engagements with the maximum back plate temperature recording approximately 880° F., which confirmed that the brake pad assembly embodying the present invention was able to withstand the compressive, bending, and shear forces imposed on it at elevated temperatures during testing without a mechanical failure and without a loss in overall coefficient of friction (Table 5).

COMPARATIVE EXAMPLE 1

A comparative example inertia dynamometer brake test was conducted in the same manner (Table 4) as in Example 1 except that the brake pad assembly was of standard design and was not an embodiment of the present invention. In this comparative example, a standard set of Hawk Performance HB221U 1.17 semi-metallic brake pads was obtained and the friction lining of each pad was rotary surface ground (i.e., Blanchard ground) to the desired thickness. The desired thickness of each brake pad was approximately 0.81 inches with an overall mass of approximately 792 grams. Therefore, the brake pad assembly embodying the present invention (Example 1) offered approximately a 43 percent reduction in mass over the standard brake pad (Comparative Example 1). See also Table 5.

During the comparative dynamometer evaluation, temperatures of the disc brake components were monitored versus time, including the brake pad temperatures, the rotor temperature, and specifically the brake fluid temperature which was monitored via an embedded thermocouple in the brake bleeder screw 22. The results of this test are also illustrated in the graph 900 in FIG. 9. The results (see solid line 904) showed that caliper fluid temperature reached approximately 405° F. within approximately 17 minutes (25 engagements). Therefore, the brake pad assembly embodying the present invention (Example 1) offered a surprising and unexpected result of 38° F. reduction in caliper brake fluid temperature versus the standard brake pad (Comparative Example 1) over the same amount of time. See also Table 5.

EXAMPLE 2

Similar to Example 1, the herein described brake pad of Example 2 was manufactured (see FIG. 6) in accordance with an automotive racing application in mind and was designed for enhanced durability. Therefore, the same requirements and desired properties of Example 1 are realized in this example. The manufacturing steps are illustrated in FIG. 6 in process flow chart 600 that begins with 601. The brake pads embodying Example 2 were tested on an inertia brake dynamometer with the parameters described in Table 6.

TABLE 6

| Item | Testing Condition |
| --- | --- |
| Testing Method | Deceleration test under constant deceleration rate |
| Inertial Mass | 43.376 slug-ft$^2$ |
| Rolling Radius | 13.750 in. |
| Brake Rotor | Grey Cast Iron, Brembo 099229.10 |
| Brake Pad Shape | Hawk Performance HB109 |
| Brake Pad Area | 12.4261 in$^2$ |
| Caliper Type | AP opposing 6-piston CP5810-5S0M |
| Piston Area per side | 4.295 in$^2$ |
| Effective Radius | 5.322 in. |
| Initial Velocity | 1830 rpm (simulated 150 mph) |
| Final Velocity | 1100 rpm (simulated 90 mph) |
| Brake Initiation Temp. | 900° F. |
| Deceleration Rate | 0.75 g |

At step 602, a commercially available set of semi-metallic brake pads (Hawk Performance HB109U.980) was obtained in the desired frictional shape and approximate thickness. The friction linings 32 from two brake pads were separated from their metal back plate by way of band-sawing. At step 604, each friction lining was then (optionally) rotary surface ground (i.e., Blanchard ground) flat such that the outer planar surfaces of the brake pad were approximately parallel. After grinding, the overall thickness of each friction lining was approximately 0.96 inches.

At step 603, a commercially available carbon/carbon composite sheet was obtained 602 in the approximate desired thickness (BlackHawk Z-26-CD). The carbon/carbon composite comprised of approximately 26 volume percent continuous fibers generally oriented parallel to the x-y in-plane 40 direction. Two pieces in the desired back plate shape were water-jet cut out of the carbon/carbon composite material. At step 605, each back plate 34 was then (optionally) Blanchard ground flat such that the outer planar surfaces of the back plate were approximately parallel and the overall thickness was approximately 0.25 inches.

In addition at step 605, the center portion of the back plate 34 was (optionally) milled down to approximately 0.18 inches leaving raised abutment surfaces 62 at the leading and trailing edges of the back plate 34. After milling, the abutment surfaces 62 were approximately 0.38 inches wide by 0.07 inches in height by the top-to-bottom length of the brake pad. Likewise, at step 604 the friction lining 32 was milled down at the leading and trailing edges 64 at approximately the same dimensions as the back plate abutments in order to accept the protruding back plate abutment surfaces 62 in an abutment configuration, such as an interlocking fashion. It is contemplated that either or both of the friction lining 32 and the back plate 34 can have raised and/or recessed abutment structure. The abutment surfaces 62 were designed and configured to absorb at least a portion of the friction force from the braking system, for example alleviating at least a portion of the force at the rivets. At step 606-607, the friction lining 32 was prepared to be combined with the back plate 34.

At step 610, counter-bored holes were machined at six locations (FIG. 5) in each of the friction linings 32 and back plates 34, such that the holes of the friction lining and back plate could be aligned during riveting to form the desired shape and frictional profile of the brake pad. The counter-bored holes were machined to receive rivets (or other fastening structure). It is to be understood that the rivets (or other fastening structure) can alternatively be located variously about the brake pad. Turning to the process flowchart 800A of FIG. 8, the method can continue from step 607 where each brake pad structure was assembled via secondary operation(s) 802, such as with six rivets in accordance with Method A (FIG. 4F), thus forming the brake pad assembly as embodied in the present invention. The overall thickness of each brake pad assembly measured approximately 1.14 inches with an overall weight of approximately 658 grams.

An inertia dynamometer brake test was also conducted to ensure that the brake pad assembly embodying the present invention could meet the strength and durability requirements for e.g., a high-performance automotive race vehicle. The test parameters of this dynamometer procedure are listed in Table 6. The objective of this evaluation was to engage the brake pad until wear-out (i.e., until the friction material wore down to the rivet heads) without catastrophic failure of the back plate or friction material. The surprising and unexpected results of this test demonstrated that the brake pad assembly of Example 2 that embodies the present invention was able to withstand 556 braking engagements at a mean inboard lining temperature of 575° C. (1,067° F.). This result confirmed that the brake pad assembly was able to withstand the compressive, bending, and shear forces imposed on it at elevated temperatures during testing without mechanical failure of the back plate or the friction material.

Although the present invention has been described in detail with reference to certain preferred versions, it is understood that variations and modifications thereof may be made without departing from the true spirit and scope of the invention. For example, while the use of the brake pad comprising friction lining and back plate structures embodying the present invention has been described in context of its use on a vehicle of some kind, this need not be the case. Rather, the structure could be employed with any type of braking system. For example, the structure could be useful in braking systems used in industrial machinery, machine tools, trucks, heavy-duty trucks, aircraft, motorcycles, trains, automobiles, ATVs, go-karts, golf carts, off-highway vehicles, agricultural vehicles and/or racing motor sports vehicles.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A brake pad assembly, for use with a caliper brake system having a caliper piston that applies a compressive force to said brake pad assembly, comprising:
   a friction lining providing a wear surface for contacting a surface of a brake rotor; and
   a non-metal, independent structurally supportive back plate made of a carbon matrix composite, free of resin and ceramic, and reinforced with carbon fibers, comprising a first side coupled directly to the friction lining without an intermediate insulating layer to structurally support the friction lining, and an opposite second side immediately adjacent to said caliper piston to receive said compressive force that pushes the friction lining against said brake rotor to produce a braking force,
   wherein production of said braking force further produces reactive flexural and shear forces against said brake pad assembly and the independent back plate has sufficient strength to withstand, and to structurally support the friction lining against, all of said compressive, flexural, and shear forces, and
   wherein the back plate comprises a generally planar support surface that defines an x-y in-plane direction arranged substantially parallel to the surface of the brake rotor, and wherein the carbon fibers of the back plate are oriented substantially along the x-y in-plane direction of the back plate to thereby conduct thermal energy produced by said compressive force being applied to said brake pad assembly along the x-y in-plane direction of the back plate and away from said caliper piston.

2. The brake pad assembly of claim 1, wherein the carbon fibers are oriented substantially parallel to the x-y in-plane direction of the back plate.

3. The brake pad assembly of claim 1, wherein a majority of the carbon fibers of the back plate are oriented in the x-y in-plane direction resulting in a structure where the thermal conductivity is at least 2 times greater in the x-y in-plane direction versus a z through-plane direction that is defined substantially perpendicular to the x-y in-plane direction.

4. The brake pad assembly of claim 3, wherein the back plate has a thermal conductivity in the x-y in-plane direction within a range of about 5 W/m-K to about 300 W/m-K; and wherein the back plate has a thermal conductivity in the z through-plane direction within a range of about 1 W/m-K to about 50 W/m-K.

5. The brake pad assembly of claim 1, wherein the friction lining is coupled to the back plate by at least one coupling structure.

6. The brake pad assembly of claim 5, wherein the at least one coupling structure comprises at least one rivet.

7. The brake pad assembly of claim 5, wherein the at least one coupling structure comprises at least one adhesive.

8. The brake pad assembly of claim 1, wherein the friction lining is coupled to the back plate by at least one in situ process.

9. The brake pad assembly of claim 8, wherein the at least one in situ process comprises at least one molding operation.

10. The brake pad assembly of claim 8, wherein the at least one in situ process comprises at least one sintering operation.

11. The brake pad assembly of claim 8, wherein the at least one in situ process comprises at least one carbonizing operation configured to form a carbonaceous bond between the friction lining and the back plate.

12. The brake pad assembly of claim 1, wherein at least one of the friction lining and the back plate comprises abutment structure formed therewith and configured to interlock with the other of the friction lining and the back plate to absorb at least a portion of a friction force from the braking system.

13. A brake pad assembly, for use with a caliper brake system having a caliper piston that applies a compressive force to said brake pad assembly, comprising:
a friction lining providing a wear surface for contacting a surface of a brake rotor; and
a non-metal, independent structurally supportive back plate with a length, width, and thickness made of a carbon matrix composite, free of resin and ceramic, and reinforced with carbon fibers, comprising a first side coupled directly to the friction lining without an intermediate insulating layer to structurally support the friction lining, and an opposite second side immediately adjacent to said caliper piston to receive said compressive force that pushes the friction lining against said brake rotor to produce a braking force,
wherein production of said braking force further produces reactive flexural and shear forces against said brake pad assembly and the independent back plate has sufficient strength to withstand, and to structurally support the friction lining against, all of said compressive, flexural, and shear forces, and
wherein a majority of the carbon fibers of the back plate are oriented in a x-y in-plane direction defined by the length and width resulting in a structure where the thermal conductivity of the back plate is at least 2 times greater in the x-y in-plane direction versus a z through-plane direction defined by the thickness to thereby conduct thermal energy produced by said compressive force being applied to said brake pad assembly along the x-y in-plane direction of the back plate and away from said caliper piston .

14. The brake pad assembly of claim 13, wherein the back plate has a thermal conductivity in the x-y in-plane direction within a range of about 5 W/m-K to about 300 W/m-K; and
wherein the back plate has a thermal conductivity in the z through-plane direction within a range of about 1 W/m-K to about 50 W/m-K.

15. The brake pad assembly of claim 13, wherein the majority of the carbon fibers of the back plate are oriented substantially parallel to the x-y in-plane direction of the back plate.

16. The brake pad assembly of claim 13, wherein the friction lining is coupled to the carbon/carbon composite back plate by at least one coupling structure or in situ process.

17. The brake pad assembly of claim 13, wherein the x-y in-plane direction defined by the length and width is arranged substantially parallel to the surface of the brake rotor.

18. The brake pad assembly of claim 12, wherein the friction lining comprises at least one protruding abutment structure formed therewith and configured to interlock with at least one recessed abutment structure of the back plate.

19. The brake pad assembly of claim 12, wherein the back plate comprises at least one protruding abutment structure formed therewith and configured to interlock with at least one recessed abutment structure of the friction lining.

20. A brake pad assembly, for use with a caliper brake system having a caliper piston that applies a compressive force to said brake pad assembly, comprising:
a friction lining providing a wear surface for contacting a surface of a brake rotor; and
a non-metal, independent structurally supportive back plate made of a carbon matrix composite, free of resin and ceramic, and reinforced with carbon fibers, comprising a first side coupled directly to the friction lining without an intermediate insulating layer to structurally support the friction lining, and an opposite second side immediately adjacent to said caliper piston to receive said compressive force that pushes the friction lining against said brake rotor to produce a braking force,
wherein production of said braking force further produces reactive flexural and shear forces against said brake pad assembly and the independent back plate has sufficient strength to withstand, and to structurally support the friction lining against, all of said compressive, flexural, and shear forces, and the back plate defining an x-y in-plane direction substantially parallel to the surface of the brake rotor and a z through-plane direction substantially perpendicular to the x-y in-plane direction,
wherein a majority of the carbon fibers of the back plate are oriented substantially along the x-y in-plane direction in such that the thermal conductivity of the back plate is at least 2 times greater in the x-y in-plane direction versus the z through-plane direction to thereby conduct thermal energy produced by said compressive force being applied to said brake pad assembly along the x-y in-plane direction of the back plate and away from said caliper piston.

21. The brake pad assembly of claim 20, wherein the back plate has a thermal conductivity in the x-y in-plane direction within a range of about 5 W/m-K to about 300 W/m-K; and
wherein the back plate has a thermal conductivity in the z through-plane direction within a range of about 1 W/m-K to about 50 W/m-K.

22. The brake pad assembly of claim 20, wherein the majority of the carbon fibers of the back plate are oriented substantially parallel to the x-y in-plane direction of the back plate.

23. The brake pad assembly of claim 20, wherein the friction lining is coupled to the carbon/carbon composite back plate by at least one coupling structure or in situ process.

24. The brake pad assembly of claim 1, wherein the second side of the back plate abuts said caliper piston.

25. The brake pad assembly of claim 13, wherein the second side of the back plate abuts said caliper piston.

26. The brake pad assembly of claim 20, wherein the second side of the back plate abuts said caliper piston.

* * * * *

UNITED STATES PATENT AND TRADEMARK OFFICE
CERTIFICATE OF CORRECTION

PATENT NO. : 8,789,665 B2  
APPLICATION NO. : 12/560714  
DATED : July 29, 2014  
INVENTOR(S) : Lawrence Frank Gilboy et al.

Page 1 of 1

It is certified that error appears in the above-identified patent and that said Letters Patent is hereby corrected as shown below:

In the Specification

Column 7, Line 56 please delete "(CVO" and add -- (CVI) --

Signed and Sealed this  
Twenty-first Day of October, 2014

Michelle K. Lee  
*Deputy Director of the United States Patent and Trademark Office*